United States Patent [19]

Urlik

[11] Patent Number: 4,967,975
[45] Date of Patent: Nov. 6, 1990

[54] MEANS AND METHOD FOR CHANGING A PORTION OF A MOVIE FILM

[76] Inventor: Randall G. Urlik, 7990 S. Clayton St., Littleton, Colo. 80122

[21] Appl. No.: 297,439

[22] Filed: Jan. 17, 1989

[51] Int. Cl.⁵ .................. B65H 19/18; B65H 75/22
[52] U.S. Cl. .................................. 242/581; 242/72 R
[58] Field of Search .............. 242/72 R, 110, 71.8, 242/116, 58.1, 205, 55.18, 79; 352/126, 128, 156

[56] References Cited

U.S. PATENT DOCUMENTS

| | | | |
|---|---|---|---|
| 1,731,817 | 10/1929 | Hudson | 242/72 |
| 1,845,526 | 2/1932 | Spence | 242/72 R |
| 1,853,301 | 4/1932 | Davidge | 242/72 R |
| 1,979,423 | 11/1934 | Tondreau | 242/72 R |
| 2,066,568 | 1/1937 | Jones | 242/72 |
| 2,335,179 | 1/1943 | Feller | 242/72 |
| 2,341,957 | 2/1944 | Storey | 242/72 R |
| 2,454,984 | 11/1948 | Bader | 242/72 |
| 2,476,928 | 7/1949 | Thomas | 242/71.8 |
| 2,546,146 | 3/1951 | Popoli | 242/71.8 |
| 2,703,684 | 3/1955 | Warfield | 242/72 R |
| 2,721,042 | 10/1955 | Betz | 242/72 R |
| 2,846,219 | 8/1958 | Matheson | 242/55.18 |
| 3,143,313 | 8/1964 | Purzycki | 242/71.8 |
| 3,780,959 | 12/1973 | Burth | 242/55.18 |
| 3,823,890 | 7/1974 | Potts | 242/55.18 |
| 3,940,085 | 2/1976 | Campbell | 242/115 |
| 4,010,910 | 3/1977 | Boudouris | 242/55.18 |
| 4,039,156 | 8/1977 | Abraham | 242/71.8 |
| 4,169,566 | 10/1979 | Boudouris | 242/55.18 |
| 4,754,878 | 7/1988 | Bose | 206/398 |

Primary Examiner—Stuart S. Levy
Assistant Examiner—Paul Thomas Bowen
Attorney, Agent, or Firm—T. M. Gernstein

[57] ABSTRACT

A film holding reel includes a deformable hub on one portion thereof, and a compound lever hub deforming mechanism is used to deform that hub from a film supporting size and configuration to a film releasing size and configuration. The lever mechanism is adapted to move easily from a position in which the hub is undeformed, to an intermediate position, and then to require further manual actuation to move to a position in which the hub is in the film releasing size and configuration. A selected film portion can be changed using the film holding reel.

24 Claims, 4 Drawing Sheets

MEANS AND METHOD FOR CHANGING A PORTION OF A MOVIE FILM

TECHNICAL FIELD OF THE INVENTION

The present invention relates to the general field of winding and reeling, and to the particular field of winding and reeling movie films. Specifically, the present invention relates to a method and a means for changing one portion of a movie film.

BACKGROUND OF THE INVENTION

Modern theater motion picture projectors are assembled from several different component parts. These parts include a projection head, a light source, a sound head and a film supply and take-up transport system. Film from a supply coil in the transport system is intermittently advanced past an aperture in the projection head, past the sound head and returned to a take-up coil in the transport system. Various types of film transports have been used, with the most common type including a film supply reel and a film take-up reel. The projection head pulls film from the supply reel at a rate required for normal projection, and the take-up reel is driven to Wind up the film after it leaves the projection head and the sound head. In some cases, the film is drawn from the center of the supply reel.

In recent years, there have been several proposals for designing the projection systems to handle longer films. This is particularly necessary in the case of the new large format films, such as 70 mm or the like. Examples of such projection systems are disclosed in various U.S. Patents such as U.S. Pat. No. 4,169,566, 4,010,910, 3,823,890 and the like. For example, the U.S. Pat. No. 4,169,566 patent, the disclosure of which is incorporated herein by reference, discloses a platter-type film transport system which includes a single unidirectional motor which drives a vertical shaft and two or more bearing plates attached to a shaft driven by the motor. A separate platter rests on each bearing plate. The platters are each free to turn on the bearing plate independently. One of the platters functions as a film source or supply and carries a coil of the film. The film is removed from the center of the coil and is delivered to the projector. As the film is removed from the center of the coil, the size of the innermost film loop is sensed for controlling an auxiliary motor which either slows the platter to a speed below the speed of the driven shaft or accelerates the platter to a speed above that of the driven shaft. Film from the projector is collected on a second or take-up platter. A circular core is attached concentrically to the film take-up platter. When the core is attached to the platter, a locking mechanism connects the platter to the bearing plate. Film from the projector passes over a dancer arm which is positioned according to film tension and is wound on the core of the take-up platter.

Devices such as the just-discussed platter system have improved the efficiency with which motion picture films are displayed, and it is now possible to show movies of great length without the need of a projectionist. Thus, while in the past, a feature length film may have been shipped to the theater in several portions each of which were, for example, twenty to thirty minutes in length, with a projectionist changing reels as necessary, it is now possible for a feature length film to be shipped in portions that far exceed the twenty to thirty minutes lengths, and can even be shipped as a single length film. A projectionist may not even be necessary in such situations. The efficiency with which a film is now displayed is thus considerably increased.

While such advances in efficiency are important and have been extremely beneficial to the film industry, the increased length of films on a single reel has produced a problem that the art has not recognized. This problem is associated with the changing of a portion of the film. That is, for example, if a movie theater is changing feature films, the initial portion of the program which includes advertisements, announcements, coming attractions and the like should also be changed to be commensurate with the new feature film. It is also highly likely that a plurality of changes will be made to such "trailers" each week, even if the feature remains unchanged.

However, due to the great length of modern films as shipped to the theater, it will be extremely difficult to change such initial portion. It is impractical to run the entire film to this initial portion, orient the film so a new initial portion can be inserted into the program, and then re-orient the entire program to be in condition for display as a whole from the beginning.

This problem is exacerbated by devices such as the aforementioned center-feeding platter-type film transport system which draw the film from the center of the reel. In such cases, the portion of the film that is to be changed is at the most inaccessible location of the overall reel, the center. This makes it even more difficult to effect a change.

The just-mentioned problems associated with changing a portion of a film are present with all films, but are greatly exaggerated in the cases of films having the large formats, such as the 70 mm films, that can be quite heavy and difficult to handle.

Accordingly, there is a need for a means and a method which permit the long modern films to have a portion thereof changed in an expeditious manner. There is a further need for such a means and method which can be used in conjunction with a center-feed film transport system.

OBJECTS OF THE INVENTION

It is a main object of the present invention to provide a means and a method for expeditiously changing a portion of a movie film.

It is another object of the present invention to provide a means and a method for expeditiously changing a portion of a movie film which is readily adaptable for use with center-feed film transport systems.

It is another object of the present invention to provide a means and a method for expeditiously changing a portion of a movie film which is readily used with large film formats, such as 70 mm or the like.

SUMMARY OF THE INVENTION

These, and other, objects are achieved by provision of a film holding reel that has a film supporting hub that is readily deformable from a normal film supporting size and condition to a deformed film releasing condition. Deforming the film supporting hub is accomplished by a mechanism that is biased to maintain the hub in a normal film supporting, undeformed condition but will shift the bias to assist the deforming during the initial movement of the mechanism. In other words, the hub deforming mechanism serves a dual purpose: to maintain the hub in its normal condition during normal film supporting situations; and to assist in the deforming of the hub during a film release situation. The mechanism thus is extremely efficient as it is always aiding the function of the film supporting reel.

The mechanism further includes a gripping jaw portion that maintains a secure grip on one end of the film being supported on the reel. The mechanism then is designed so that the initial operation thereof will not fully release the film, but will permit a user to partially release the film, move the reel to a desired location and/or orientation, and then fully release that film by further actuation of the mechanism. This will give the user more freedom in his work as the film will be securely supported on the reel but can be easily released without undue operations when desired.

Using the mechanism of the present invention permits a user to quickly change a selected portion of a film to a new portion by transferring the selected portion of movie film to either a film holding reel such as just described or to another reel, then supporting a new portion of film on the just-described film supporting reel, and quickly and easily dropping the new portion adjacent to the remainder of the film for splicing thereto. The easy manipulation of the film supporting reel permits such operations to be easily and reliably carried out.

DETAILED DESCRIPTION OF THE PREFERRED EMBODIMENT OF THE INVENTION

Figure 1:
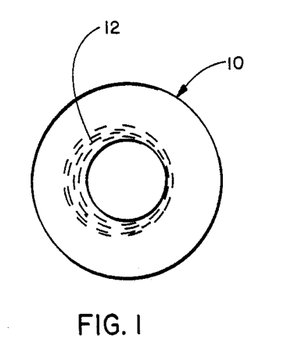
FIG. 1 is a plan view of a platter used in a platter-type film transport system.
Figure 2:
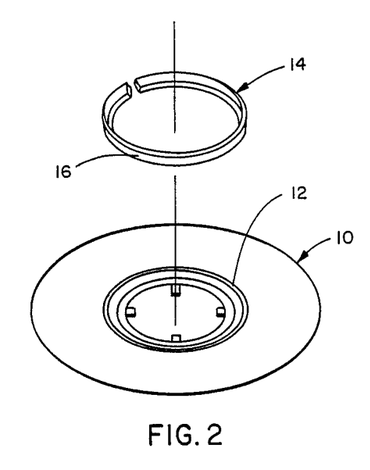
FIG. 2 is a perspective view of a FIG. 1-type platter showing a central hub removed.

Shown in FIG. 1 is a platter 10 of the type used in the above-referenced film transport systems. Film 12 is positioned in a coil on the platter. This platter can be, for example, a supply platter. From the platter 10, the film is removed by unwinding from the center of the coil and is delivered to a projector including a projection head and a sound head. As the film is advanced through the projector, it is moved to where it is wound in another coil about a core attached to another, take-up, platter. After the film is wound upon the take-up platter, the core of that take-up platter is moved to another platter, and the platters can be interchanged as necessary to re-show the film. As shown in FIG. 2, the platter includes a removable hub 14, which can be similar to the removable hub disclosed in U.S. Pat. No. 4,754,878, the disclosure of which is incorporated herein by reference. Accordingly, the hub 14 includes an outer surface 16 on which the film is wound, and is compressible to be released from the film. The hub is also releasably connected to the platter, and removal of the hub will leave the film 12 on that platter as is indicated in FIG. 2.

However, as above discussed, there is often a need to change a selected portion of the film and substitute therefor a new portion of film. Such a selected portion can be made up on a make-up table or the like, per devices such as is disclosed in U.S. Pat. No. 3,823,890. As above mentioned, this creates problems, and the present invention is intended to overcome such problems.

Figure 3:
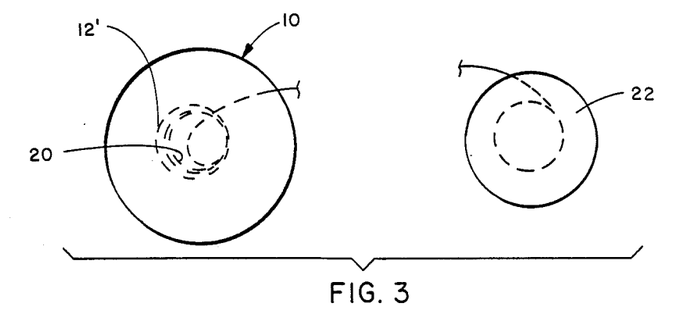
FIG. 3 is a schematic of a first step in changing a portion of movie film.
Figure 4:
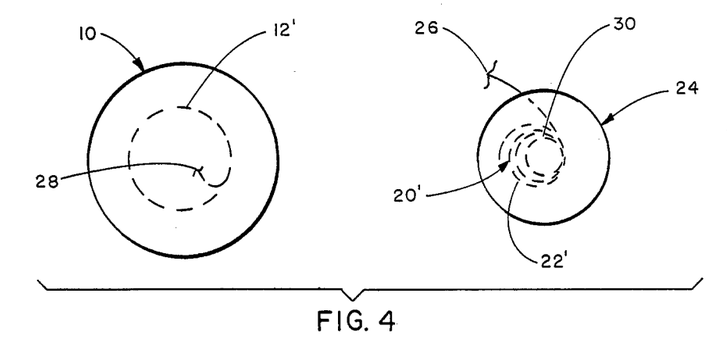
FIG. 4 is a schematic of another step in changing a portion of movie film.

As shown in FIG. 2-4, the present invention permits a user to easily transfer a selected portion of the film 12, as indicated in FIG. 3 as initial portion 20, from the platter 10 to a second reel 22, which can be similar to those reels used on make-up tables or the like. For the sake of clarity, the selected portion of the film being changed is indicated as portion 20 and the remaining portion of that film is indicated as portion 12'. For example, the selected portion 20 can include the previews of coming attractions, advertisements and the like while the remaining portion 12' can include a main feature. Portion 12' will remain on the platter while portion 20 will be changed for a new portion. It is noted that "trailers" are most often added to the built-up feature at the last minute prior to screening. A film holding reel will be used on the make-up table to assemble the trailers just before being dropped into the main program, and the film holding reel of the present invention is ideal for such an operation.

The hub 14 is removed and portion 20 is fed to reel 22 as indicated in FIG. 3, and then is removed from the remaining portion 12'.

Referring next to FIG. 4, it is seen that a new portion 20' is mounted on a film holding reel 24 and includes a first terminal end 26 which is free and which will be spliced to terminal end 28 of the film remaining portion 12', and a second terminal end 30 which is releasably attached to the reel 24. The film holding reel and its operation will be discussed in detail below.

To effect the change of new portion 20' for selected portion 20, after the separation of the portion 20, end 26 of new portion 20' is spliced to end 28, and the film holding reel 24 is positioned to locate new portion 20' inside the coil of the film 12' as was portion 20 shown in FIG. 3. The film holding reel 24 is then operated to release the film portion 20', and this portion falls into the proper location inside the film coil in the manner of Portion 20. If there are any adjustments necessary, the film transport systems usually have automatic means to effect such adjustment. The hub 14 can then be replaced as necessary or left out if suitable.

As above discussed, the just-discussed film portion change should be as expeditious and easy as possible and should be amenable for use in conjunction with large format films that might be heavy and difficult to handle. This object requires that the film holding reel 24 be easily manipulated and reliable. The film holding reel 24 of the present invention accomplishes these objects and will now be discussed with reference to FIGS. 5-10.

Figure 5:
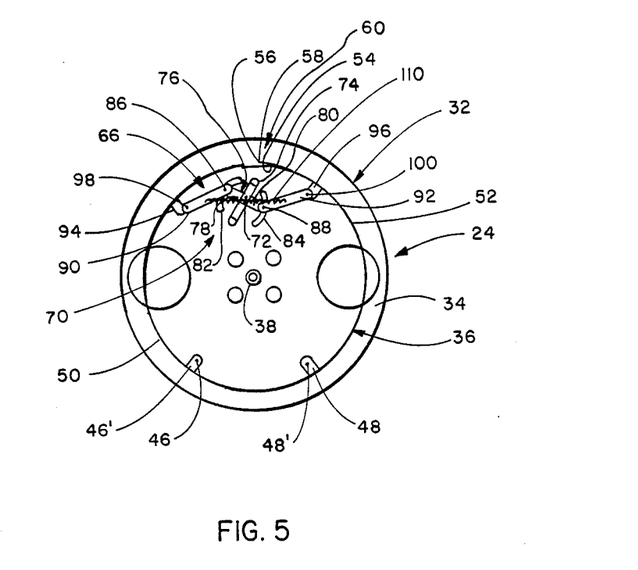
FIG. 5 is a plan view of a first reel portion of a film holding reel embodying the present invention.
Figure 6:
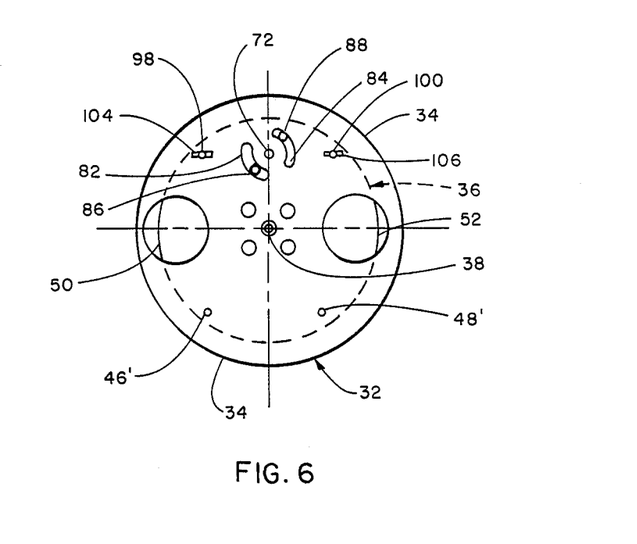
FIG. 6 is a plan view of the reverse side of the first reel portion shown in FIG. 5.

Referring generally to FIGS. 5 and 6, and particularly to FIG. 5, the film holding reel 24 is seen to include a first reel portion 32 having a planar flange 34 to which is attached a deformable film supporting hub 36. An externally threaded drive spindle receiving boss 38 is internally polygonal to drivingly connect the first reel portion 32 to a driving means to rotate the reel 24.

The hub is mounted on the flange by means which includes L-shaped gusset-like anchors 46 and 48 which are secured to the flange by anchor pins 46' and 48' respectively. The anchors are immovable, and thus the portion of the hub 36 adjacent to the anchors is essentially immovable with respect to that flange. However, the hub is formed of flexible material, and thus will be deformable in the manner to be discussed below.

The hub 36 is separated into two segments 50 and 52 and these two segments include terminal ends 54 and 56 respectively. The segment 50 has a radially inwardly offset portion forming a tongue 58 located adjacent to the terminal end 54. The offset tongue thus is overlapped by the portion of the segment 52 adjacent to the terminal end 56 to form a lap joint 60. The lap joint 60 serves to grip end 30 of the film portion 20' to hold the film portion 20' on the hub 36 in a non-slipping manner. As will be discussed below, this lap joint is opened to release the film portion 20' but will remain partially closed to pinch the film between the segments 50 and 52 until such time as the lap joint is configured to fully release the film.

As above discussed, the film holding reel 24 is intended to hold a portion of film 20' in a manner that permits such portion of film to be easily removed from that reel. This is accomplished by deforming the hub 36 from a film supporting size in which the outer circumference thereof is suitable for securely holding the film portion 20' in place on the hub to a film releasing size and orientation that reduces the outer circumference of the hub sufficiently to permit the film portion 20' to easily move off of the hub. The film releasing size of hub 36 can be selected to leave enough of a gap between the innermost coil of film and the hub outer surface so that gravity can exert sufficient force on the film to move it off of the hub when the reel is suitably oriented. Other film releasing sizes can be selected so that some external force is required to push the film off of the hub, as will occur to those skilled in the art based on the teaching of this disclosure.

Figure 8:
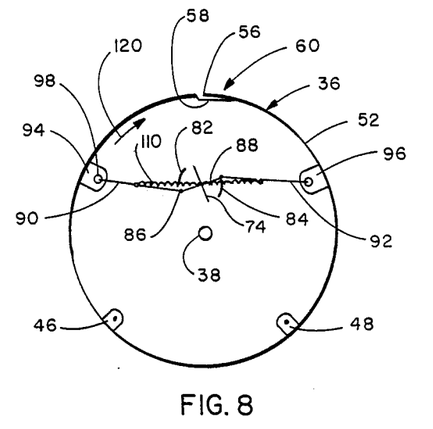
FIG. 8 is a schematic showing a first position of the hub deforming mechanism with the hub in an undeformed, film supporting condition and size.
Figure 9:
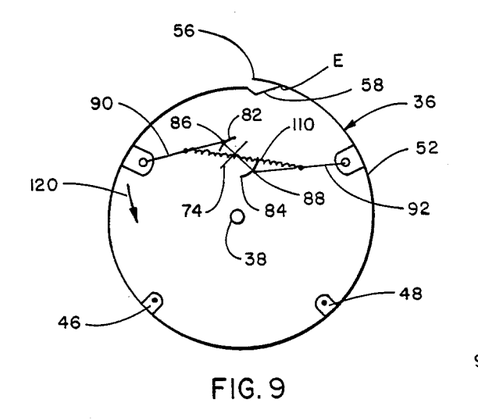
FIG. 9 is a schematic showing an intermediate position of the hub deforming mechanism with the hub in a slightly deformed condition.
Figure 10:
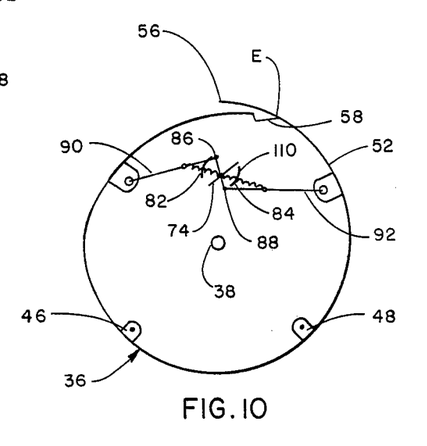
FIG. 10 is a schematic showing a second position of the hub deforming mechanism with the hub in a deformed, film releasing condition and size.

The film holding reel portion 32 thus includes a hub deforming mechanism 66 to move the hub from the film supporting size shown in FIG. 8 to a film releasing size as shown in FIGS. 9 or 10.

Referring to FIG. 5, it is seen that the film releasing mechanism 66 comprises a compound lever system which includes a crank 70 rotatably mounted on the flange 34 by a pivot pin 72 located at the center of the crank to form a pivot axis about which the crank 70 rotates. The crank is a monolithic T-lever type having a handle portion 74 and a pitman arm portion 76 having arms 78 and 80 extending outwardly from the handle portion. Two arcuate slots 82 and 84 are defined in the flange 34 to be located near the outer extremity of each of the arms 78 and 80 respectively. Wristpins 86 and 88 slidingly attach the arms 78 and 80 respectively to the flange at the slots 82 and 84.

The crank 70 is connected to the hub by connecting links 90 and 92 each connected at one end respectively to the arms 78 and 80 by the pins 86 and 88. The other end of each of the connecting links is fixedly connected to the hub 36 by L-shaped gusset-like anchors 94 and 96 and anchor pins 98 and 100 respectively As shown best in FIG. 6, the anchor pins 98 and 100 are slidingly mounted on the flange 34 in straight slots 104 and 106 respectively. The slots 104 and 106 are positioned on different secants with respect to the hub, and this positioning will permit the hub deforming mechanism to operate in a manner discussed below.

The links 90 and 92 are connected together by a coiled compression spring 110 which is connected to each of the links at a location between the ends of such links, and which extends over the pivot pin 72 to intersect the pivot axis of the crank 70. The compression spring biases the links in a manner which will be discussed below to bias the mechanism 66 toward the FIG. 8 hub film supporting size and orientation when the crank 70 is in the orientation shown in FIG. 8, but will change such bias to a hub deforming bias when the crank is rotated clockwise from the orientation shown in FIG. 8. FIG. 8 will be discussed in greater detail below.

Figure 7:
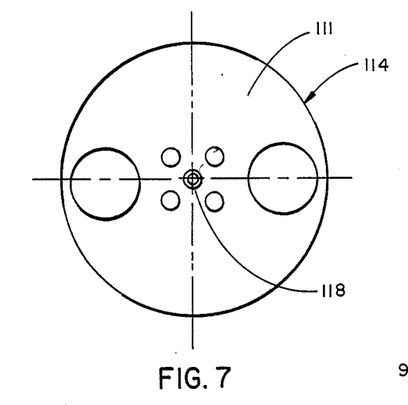
FIG. 7 is a plan view of a second reel portion of the film holding reel of the present invention.

The film supporting reel 24 further includes a second portion 114 which is best shown in FIG. 7 to include a planar flange 116. The second portion 114 includes a connecting boss 118 mounted on the flange 116 and which is internally threaded to co-operatively associate with the externally threaded boss 38 for releasably connecting the portions 32 and 114 together.

Operation of the hub deforming mechanism 66 is best shown in FIGS. 8-10, and attention is now adverted thereto. For the sake of clarity, the flange portion of the reel is not shown, and the operating mechanism is shown only in schematic; however, no limitation is intended by such schematic showing.

FIG. 8 shows the hub 36 in its undeformed, essentially round film supporting configuration and size. It is noted that FIG. 5 corresponds to FIG. 9 with the hub very slightly deformed from a circular condition. FIG. 8 shows the mechanism 66 in its first position that is orientated for the hub film supporting condition. The mechanism 66 includes the handle 74, and in the FIG. 8 configuration, the handle is oriented to be slightly tilted with respect to a radius connecting the jaw portion 60 and the center-located boss 38. The amount of tilt for the handle is selected and adjusted so that the pivot defined by the pin 86 is located as shown in FIG. 8 with pins 86 and 98 located on opposite sides of the spring 110 so that the spring biases the link 90 in a clockwise direction, as indicated by arrow 120. The pin 86 is bottomed against the flange 34 in the slot 82 and thus a third class type lever arm is established which tends to pull the hub segment 50 inwardly in the general direction indicated by arrow 120. This bias tends to deform the hub from the circular configuration and tends to move the tongue 58 clockwise with respect to the hub segment 52 thereby biasing the mechanism in a hub-deforming manner.

The spring and the elements of mechanism 66 that are associated with the link arm 92 are arranged so that this link arm is essentially disabled and essentially no hub deforming force is exerted by this link arm. This constraint is provided since, due to the lever action, biasing force exerted by the link 92 might tend to bias the hub segment 52 in opposition to the bias exerted on the hub by the link 90. To accomplish this constraint on the action of the link 92, in the FIG. 8 configuration, the spring 110 is positioned to extend across the pivot axis for the link 92 formed by the pin 88.

It is also noted that by being positioned so that the spring is positioned between the pins 86 and 98, the biasing force exerted by the spring in the FIG. 8 configuration of the mechanism 66 tends to keep the crank in the FIG. 8 position. Thus, the spring acts as a type of lock to keep the hub in the FIG. 8 undeformed configuration. The slots 82 and 84 are also arranged and sized so that the pins 86 and 88 abut the ends of the slots to keep the mechanism locked in the FIG. 8 condition.

To deform the hub out of the circular configuration, the crank 70 is rotated clockwise from the FIG. 8 orientation toward the FIG. 9 orientation. As soon as the crank is slightly rotated, the pin 86 moves above the spring and the pin 88 is re-oriented to be below that spring as shown in FIG. 9. This reversing of pins with respect to the spring causes a reversal of the biasing force of the spring from the clockwise direction shown in FIG. 8 by arrow 120 to a counterclockwise direction shown in FIG. 9 by arrow 120'. However, the pin 86 has moved from the end of the slot 82 and is free to be moved as guided by the slot 82 inwardly of the hub and generally toward the crank pivot axis. By such co-operation and re-orientation of forces, the biasing of the spring on the link 90 tends to further deform the hub into a non-circular configuration as indicated in FIG. 9. A similar action occurs for the link 92, but will not be discussed since those skilled in the art will understand such action based on the disclosure presented herein.

As the link 90 moves inwardly, the pin 88 of the link 92 moves in its associated slot 84 thereby permitting the link 92 to move inwardly of the hub and generally toward the crank pivot axis. This inward movement of the link 92 acts to further deform the hub.

The tongue 58 is sized to have the end 54 thereof tend toward engagement with the inner surface of the hub segment 52 so that the hub-deforming force exerted by the spring 110 is countered by a friction force between end E of the tongue 58 and the inner surface of the hub segment 52 via a film portion trapped therebetween. The size of the tongue and the spring forces are adjusted so that while the biasing force of the spring is sufficient to move the hub from the FIG. 8 to the FIG. 9 configuration with little or no manual rotating force being exerted on the crank after the pins of the link 90 are reversed as just discussed, as soon as the hub reaches the FIG. 9 configuration, the friction forces become great enough to stop further crank rotation and its associated deforming of the hub under the influence of the spring alone.

Further hub deformation will require an operator to manually rotate crank 70 in the further clockwise direction against this frictional force.

This stopping permits an operator to loosen, but not free, the film portion 20' so that it can be moved to a desired location without falling off of the reel. However, to completely free the film from the reel, the crank must be manually turned from the FIG. 9 to the FIG. 10 orientation with enough force to overcome the friction force by and on the tongue.

In the FIG. 9 configuration, the mechanism 66 is in a second position with the pins 86 and 88 being bottomed against the other ends of the slots 82 and 84 thereby forming levers that are biased by the spring inwardly of the hub and generally toward the crank pivot axis thereby maintaining a hub-deforming bias on the hub. This permits an operator to be free to concentrate on the movement of the film and not be required to further manipulate the film holding reel to move the film therefrom. However, the third position of the mechanism 66, shown in FIG. 9 and discussed above as having a friction force associated with the tongue 58 stopping the further deformation of the hub under the influence of spring 110 alone, will permit that operator to move the film holding reel after the film is partially released.

Since the portion of the hub located adjacent to the anchors 46 and 48 is not deformed, that portion of the hub will remain in a film-supporting configuration. This will permit the reel to retain some control over the film even after the hub has been deformed into the film releasing configuration.

Figure 11:
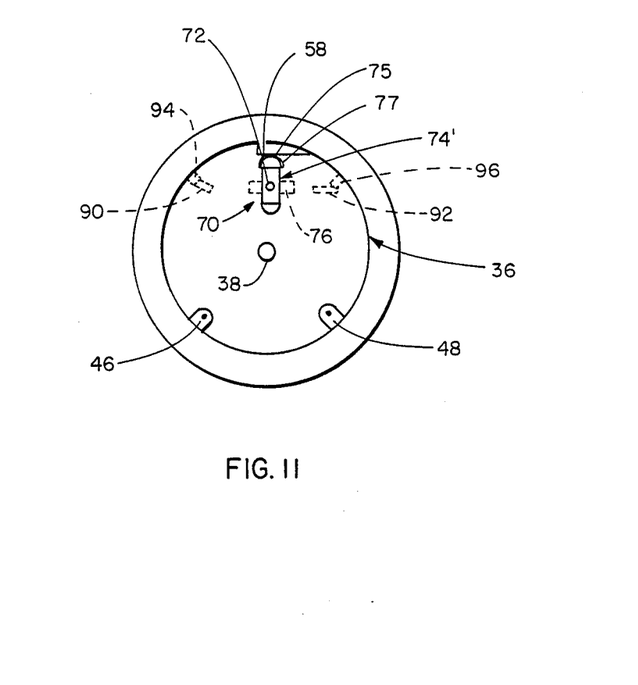
FIGS. 11 and 12 show an alternative embodiment of the crank used in the present invention.
Figure 12:
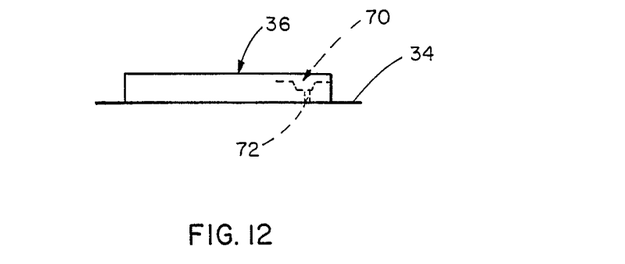

Shown in FIGS. 11 and 12 is a modification of the crank 70. For the sake of clarity, only the modified portion of the hub deforming mechanism is shown in FIGS. 11 and 12. As shown in these figures, the handle portion 74' is extended axially from that dimension shown in FIG. 5 for handle portion 74. Accordingly, handle portion 74' has a nose 75 that abuts the inner surface of tongue 58 to support such tongue in the closed condition. It is noted that modified crank 74' assumes a position slightly different from crank 74 in the hub closing configuration. This can be seen by comparing FIGS. 8 and 11, both of which show a hub-closing configuration, and noting that crank 74' is rotated clockwise from crank 74. The cranks 74 and 74' both include a deformable cover, indicated in FIG. 11 as cover 77. The cover 77 functions as a cushion between the crank and the tongue inner surface so that ease of operation of the crank is provided.

It is to be understood that while certain forms of the present invention have been illustrated and described herein, it is not to be limited to the specific forms or arrangement of parts described and shown.

I claim:

1. A film holding reel comprising:
(A) a first reel portion which includes
 (1) a flange and
 (2) a deformable film supporting hub having
  (a) a film gripping jaw means for releasably grasping an end of a film being supported on said hub,
  (b) anchor means attaching said hub to said flange, and
  (c) hub deforming means for deforming said hub from a film supporting size to a film releasing size, said hub deforming means having biasing means which biases said hub toward said film supporting size when said deforming means is in a first position and which biases said hub towards said film releasing size when said hub deforming means is in a second position, said hub deforming means further including a crank rotatably mounted on said flange, two connecting links each being connected at one end thereof to said hub and at the other end thereof to said crank, two arcuate slots defined in said flange and a first pin on each connecting link connecting each of said connecting links to said flange adjacent to each of said arcuate slots; and
(B) second reel portion which includes means for releasably connecting said second reel portion to said first reel portion.

2. The film holding reel defined in claim 1 wherein said first reel portion further includes a means for drivingly connecting said first reel portion to a driven shaft of a drive means.

3. The film holding reel defined in claim 1 wherein said hub deforming means includes a compound lever having two lever members each of which is connected to said hub.

4. The film holding reel defined in claim 3 wherein one lever member of said two lever members exerts hub deforming force on said hub when said hub deforming means is in said first position and the other lever member is prevented from exerting deforming force on said hub when said hub deforming means is in first position.

5. The film holding reel defined in claim 1 further including anchor means fixedly mounting a portion of said film hub to said flange.

6. The film holding reel defined in claim 1 wherein said crank is t-shaped.

7. The film holding reel defined in claim 6 wherein said crank includes a handle portion having a nose section, said crank handle portion being sized to engage said film supporting hub when said deforming means is in said first position.

8. The film holding reel defined in claim 6 wherein said crank includes a handle portion and a cushion means on said handle portion.

9. The film holding reel defined in claim 3 wherein includes two portions and said hub is separated adjacent to said gripping jaw means and includes a tongue on one portion of said hub which is overlapped by the other portion of said hub.

10. The film holding reel defined in claim 9 wherein said tongue is adapted to press a section of film between said tongue and the other portion of said hub to produce a frictional engagement.

11. The film holding reel defined in claim 10 wherein said frictional engagement is arranged to prevent said biasing means from moving said hub into said film releasing size after said deforming means has moved out of said first position and before said hub deforming means has moved into said second position so that said deforming means stops at a third position between said and first position said second position and additional force must be exerted on said crank to move said deforming means from said third position to said second position.

12. The film holding reel defined in claim 11 wherein said deforming means further includes two straight slots and a second pin on each connecting link connecting each of said connecting links to said flange adjacent to each of said straight slots.

13. The film holding reel defined in claim 12 wherein said spring is connected to each of said links at a location on each of said links that is between the first pin and the second pin associated with said each link.

14. The film holding reel defined in claim 13 wherein said crank includes a pivot axis and said spring intersects said crank pivot axis.

15. The film holding reel defined in claim 14 wherein said spring includes a body and said first pin and said second pin of one link are located on opposite sides of said spring body when said deforming means is in said first position.

16. The film holding reel defined in claim 15 wherein said other link has a pivot axis through said first pin and said spring body intersects said other link pivot axis when said deforming means is in said first position.

17. The film holding reel defined in claim 16 wherein said first pin and said second pin of said one link are located on the same side of said spring body when said deforming means is in said second and third positions.

18. A method of changing a portion of a movie film comprising:

(A) providing a coil of movie film on a first platter, the movie film having a selected portion of movie film to be changed and a remaining portion of movie film which will be unchanged, with the selected portion of movie film having an outer diameter and the remaining portion of movie film having an inner diameter which is larger than the outer diameter of the selected portion of movie film, the remaining portion of movie film surrounding the selected portion of movie film;

(B) providing a film holding reel which comprises
(1) a flange,
(2) a deformable film supporting hub having
 (a) an outside surface on which movie film can be supported, the outside surface having an outer diameter,
 (b) a film gripping jaw means for releasably grasping an end of movie film supported on the film supporting hub,
 (c) anchor means attaching the film supporting hub to the flange,
 (d) the film supporting hub being adapted to move between a film supporting size in which the film supporting hub outside surface has a film supporting outer diameter to a film releasing size in which the film supporting hub outside surface has a film releasing outer diameter, with the film releasing outer diameter being smaller than the film supporting outer diameter, and
 (e) hub deforming means for deforming the film supporting hub from the film supporting size to the film releasing size, the hub deforming means including
  (i) biasing means which biases the hub toward the film supporting size when the deforming means is in a first position and which biases the hub towards the film releasing size when the hub deforming means is in a second position,
  (ii) a crank rotatably mounted on the flange,
  (iii) two connecting links each being connected at one end thereof to the film supporting hub and at the other end thereof to the crank,
  (iv) two arcuate slots defined in the flange,
  (v) a first pin on each connecting link connecting each of the connecting links to the flange adjacent to each of the arcuate slots, and
  (vi) the biasing means including a spring connecting the connecting links together, and
(3) a second reel portion which includes means for releasably connecting the second reel portion to the first reel portion;

(C) holding the film supporting hub in the film supporting size and supporting a new portion of movie film on the outside surface of the film supporting hub, the new portion of movie film on the film supporting hub being in a coil form and having an outside diameter which is less than the inside diameter of the remaining portion of movie film on the first platter, (D) removing the selected portion of movie film from the remaining portion of movie film on the first platter and leaving an empty area which is circumscribed by the remaining portion of movie film on the first platter;

(E) separating the selected portion of movie film from the remaining portion of movie film on the first platter;

(F) splicing the new portion of movie film to the remaining portion of movie film;

(G) locating the film supporting hub with the new portion of movie film thereon in the empty area inside the remaining portion of movie film on the first platter so that such remaining portion of movie film surrounds the new portion of film and the film supporting hub;

(H) operating the film supporting hub deforming means and moving the film supporting hub to the film releasing size;

(I) releasing the new portion of movie film from the film supporting hub and supporting the new portion of movie film on the first platter inside the remaining portion of movie film;

(J) removing the new portion of movie film from the film supporting hub; and (J) removing the film supporting hub from inside the new portion of movie film.

19. The method defined in claim 18 wherein the selected portion of movie film is located at the center of the remainder of the movie film.

20. The method defined in claim 19 including gripping the new portion of movie film near one end thereof.

21. The method defined in claim 20 including maintaining the grip on the new portion when the film supporting hub is in the film releasing size.

22. The method defined in claim 21 including moving the film supporting hub to a third size between the film supporting size and the film releasing size.

23. A reel comprising:
(A) a first reel portion which includes
  (1) a flange, and
  (2) a deformable film supporting hub having
    (a) a film gripping jaw means for releasably grasping an end of an article being supported on said hub,
    (b) anchor means attaching said hub to said flange, and
    (c) hub deforming means for deforming said hub to decrease the peripheral size of said hub from a supporting size to a releasing size, said hub deforming means having biasing means which biases said hub toward said supporting size when said deforming means is in a first position and which biases said hub towards said releasing size when said hub deforming means is in a second position, said hub deforming means further including a crank rotatably mounted on said flange, two connecting links each being connected at one end thereof to said hub and at the other end thereof to said crank, two arcuate slots defined in said flange and a first pin on each connecting link connecting each of said connecting links to said flange adjacent to each of said arcuate slots; and
(B) second reel portion which includes means for releasably connecting said second reel portion to said first reel portion.

24. A film holding reel comprising:
(A) a first reel portion which includes
  (1) a flange and
  (2) a deformable film supporting hub having
    (a) a film gripping jaw means for releasably grasping an end of a film being supported on said hub,
    (b) anchor means attaching said hub to said flange,
    (c) hub deforming means for deforming said hub from a film supporting size to a film releasing size, said hub deforming means having biasing means which biases said hub toward said film supporting size when said deforming means is in a first position and which biases said hub towards said film releasing size when said hub deforming means is in a second position, said hub deforming means further including a t-shaped crank rotatably mounted on said flange, two connecting links each being connected at one end thereof to said hub and at the other end thereof to said crank, two arcuate slots defined in said flange and a first pin on each connecting link connecting each of said connecting links to said flange adjacent to each of said arcuate slots,
    (d) said hub including two portions and being separated adjacent to said gripping jaw means and includes a tongue on one portion of said hub which is overlapped by the other portion of said hub, said tongue being adapted to press a section of film between said tongue and the other portion of said hub to produce a frictional engagement, with said frictional engagement being arranged to prevent said biasing means from moving said hub into said film releasing size after said deforming means has moved into said second position so that said deforming means stops at a third position between said first position and said second position and additional force must be exerted on said crank to move said deforming means from said third position to said second position; and
(B) second reel portion which includes means for releasably connecting said second reel portion to said first reel portion.

* * * * *